(12) United States Patent
Havlicek et al.

(10) Patent No.: US 10,552,523 B2
(45) Date of Patent: Feb. 4, 2020

(54) AUTOMATICALLY IDENTIFYING SYNONYMS WITHIN A TOKEN-BASED DATABASE MANAGEMENT SYSTEM

(71) Applicant: SAP SE, Walldorf (DE)

(72) Inventors: Jim Havlicek, Onalaska, WI (US); Tim Parker, Loyal, WI (US)

(73) Assignee: SAP SE, Walldorf (DE)

( * ) Notice: Subject to any disclaimer, the term of this patent is extended or adjusted under 35 U.S.C. 154(b) by 604 days.

(21) Appl. No.: 15/294,465

(22) Filed: Oct. 14, 2016

(65) Prior Publication Data

US 2018/0107702 A1  Apr. 19, 2018

(51) Int. Cl.
*G06F 17/24* (2006.01)
*G06F 17/27* (2006.01)

(52) U.S. Cl.
CPC ............ *G06F 17/24* (2013.01); *G06F 17/277* (2013.01); *G06F 17/2795* (2013.01)

(58) Field of Classification Search
CPC ..... G06F 17/24; G06F 17/277; G06F 17/2795
See application file for complete search history.

(56) References Cited

U.S. PATENT DOCUMENTS

| | | | |
|---|---|---|---|
| 6,523,041 B1 * | 2/2003 | Morgan ................. | G06Q 30/02 |
| 7,296,019 B1 * | 11/2007 | Chandrasekar ....... | G06F 17/273 |
| 9,311,301 B1 | 4/2016 | Balluru et al. | |
| 9,519,871 B1 * | 12/2016 | Cardonha ............... | G06F 16/93 |
| 2008/0155398 A1 * | 6/2008 | Bodin ................... | G06F 17/273 |
| | | | 715/257 |
| 2009/0132527 A1 * | 5/2009 | Sheshagiri ............. | G06Q 30/02 |
| 2010/0145676 A1 * | 6/2010 | Rogers .................. | G06F 17/211 |
| | | | 704/9 |
| 2012/0117082 A1 * | 5/2012 | Koperda ............. | G06F 16/3331 |
| | | | 707/748 |
| 2014/0129261 A1 | 5/2014 | Bothwell et al. | |
| 2015/0006563 A1 * | 1/2015 | Carattini ........... | G06F 16/24534 |
| | | | 707/765 |
| 2015/0161144 A1 * | 6/2015 | Goto ..................... | G06F 17/275 |
| | | | 707/739 |
| 2016/0026621 A1 * | 1/2016 | Misra .................. | G06F 17/2785 |
| | | | 704/9 |
| 2016/0041990 A1 * | 2/2016 | Dabah .................. | G06F 17/276 |
| | | | 707/722 |
| 2016/0253299 A1 * | 9/2016 | Mese ..................... | G06F 17/24 |
| | | | 715/271 |

\* cited by examiner

*Primary Examiner* — Cam Y T Truong
(74) *Attorney, Agent, or Firm* — Mintz Levin Cohn Ferris Glovsky and Popeo, P.C.

(57) ABSTRACT

In some embodiments, a system for automatically identifying synonyms within a token-based data management system includes a database configured to store a plurality of records, and a computing device having a synonym locator configured to create a token synonym mapping by automatically identifying token synonyms within the plurality of records based on a statistical analysis of the plurality of records. The token synonym mapping includes a first token linked to a second token, where the second token is a valid synonym of the first token. The computing device includes a synonym standardizer configured to standardize at least one record of the plurality of records based on the token synonym mapping such that, when the at least one record includes the second token, the synonym standardizer is configured to automatically replace the second token with the first token.

18 Claims, 11 Drawing Sheets

 Record₁ HOT CHOCOLATE 12OZ PACKET 112-1
 Record₂ HOT CHOCOLATE 12OZ PCKT 112-2
 Record₃ PLASTIC POCKT FOLDER 112-3
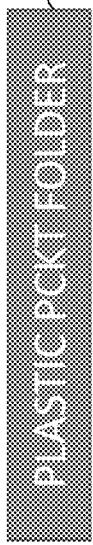 Record₄ PLASTIC PCKT FOLDER 112-4
FIG. 5

| Record | Token1 | Token2 | Token3 |
|---|---|---|---|
| 1 | HOT | CHOCOLATE | PACKET |
| 1 | HOT | CHOCOLATE | OZ |
| 1 | HOT | CHOCOLATE | 12 |
| 1 | HOT | OZ | PACKET |
| 1 | HOT | OZ | 12 |
| 2 | HOT | CHOCOLATE | PCKT |
| 2 | HOT | CHOCOLATE | OZ |
| 2 | HOT | CHOCOLATE | 12 |
| 2 | HOT | OZ | PCKT |
| 2 | HOT | OZ | 12 |
| 3 | PLASTIC | FOLDER | POCKET |
| 4 | PLASTIC | FOLDER | PCKT |

| Record | Token1 | Token2 | Token3 |
|---|---|---|---|
| 1 | HOT | CHOCOLATE | PACKET |
| 1 | HOT | CHOCOLATE | OZ |
| 1 | HOT | CHOCOLATE | 12 |
| 2 | HOT | CHOCOLATE | PCKT |
| 2 | HOT | CHOCOLATE | OZ |
| 2 | HOT | CHOCOLATE | 12 |

702

| Record | Token1 | Token2 | Token3 |
|---|---|---|---|
| 1 | HOT | OZ | PACKET |
| 1 | HOT | OZ | 12 |
| 2 | HOT | OZ | PCKT |
| 2 | HOT | OZ | 12 |

703

| Record | Token1 | Token2 | Token3 |
|---|---|---|---|
| 3 | PLASTIC | FOLDER | POCKET |
| 4 | PLASTIC | FOLDER | PCKT |

| Record | Token1 | Token2 | Token3 |
|---|---|---|---|
| 1 | HOT | CHOCOLATE | PACKET |
| 2 | HOT | CHOCOLATE | PCKT |

153a/153b

| Record | Token1 | Token2 | Token3 |
|---|---|---|---|
| 1 | HOT | OZ | PACKET |
| 2 | HOT | OZ | PCKT |

153a/153b

| Record | Token1 | Token2 | Token3 |
|---|---|---|---|
| 3 | PLASTIC | FOLDER | POCKET |
| 4 | PLASTIC | FOLDER | PCKT |

AUTOMATICALLY IDENTIFYING SYNONYMS WITHIN A TOKEN-BASED DATABASE MANAGEMENT SYSTEM

BACKGROUND

Free-form text fields stored in a database often have fixed length limitations. When entering text such as a product description, a user may be challenged to abbreviate terms within the description so that it fits within the limit of the record. If various users abbreviate terms differently, these inconsistencies may creep into the text fields, making them difficult to search and analyze. To complicate matters, the same word may need to be abbreviated differently in different contexts, so as to avoid ambiguity. For instance, if a description contains the terms CONTACT LENSES, it might be acceptable to abbreviate the term CONTACT as CON. However, if a description, or set of related descriptions, contains both CONTACT and CONTROL, it might be conventional to abbreviate CONTACT as CTCT and CONTROL as CTRL to avoid ambiguity. A common approach is for an organization to document abbreviation rules and ask that the employees follow the rules (e.g., to follow a predefined dictionary for certain terms). Also, the IT staff may develop code to enforce the abbreviation rules. However, these conventional approaches may be relatively labor intensive, both to initially develop and later to maintain the predefined dictionary.

SUMMARY

In some embodiments, a system for automatically identifying synonyms within a token-based data management system includes a database configured to store a plurality of records, and a computing device having a synonym locator configured to create a token synonym mapping by automatically identifying token synonyms within the plurality of records based on a statistical analysis of the plurality of records. The token synonym mapping includes a first token linked to a second token, where the second token is a valid synonym of the first token. The computing device includes a synonym standardizer configured to standardize at least one record of the plurality of records based on the token synonym mapping such that, when the at least one record includes the second token, the synonym standardizer is configured to automatically replace the second token with the first token.

The system may include one or more of the following features. The token synonym mapping may include context data associated with the second token, and the context data has a first context token and a second context token. The synonym standardizer may replace the second token with the first token if the at least one record also includes at least one of the first context token and the second context token. The synonym standardizer may automatically abbreviate text within a new record based on the token synonym mapping, where the text includes a first word associated with the first token. The synonym standardizer may replace the first word with an abbreviation associated with the second token such that the text can fit within a fixed length of the record. The synonym standardizer may automatically abbreviate the text in real time as a user is typing the text of the record. The synonym standardizer may calculate confidence levels for terms within the new record on a level of similarity of the new record to existing records in the database, and determine to replace the first word with the abbreviation based on its confidence level being higher than a confidence level associated with another term included within the new record. The synonym standardizer may determine a number of times that the abbreviation has been replaced for the first word within the records of the database, and replace the first word with the abbreviation based on the number of times being greater than a number of times that another word in the new record has been replaced with that another word's abbreviation. The system may include token-based entity resolution circuitry configured to determine whether a current record is similar to one or more other records in the database based on a token-record mapping of tokens to records, and update the token-record mapping based on the identified token synonyms. The database may be an in-memory database.

In some examples, a non-transitory computer-readable medium storing executable instructions that when executed cause at least one processor to create a token synonym mapping by automatically identifying token synonyms within a plurality of records stored in a database based on a statistical analysis of the plurality of records, where the token synonym mapping includes a first token linked to a second token, and the second token is a valid synonym of the first token, and standardize at least one record of the plurality of records based on the token synonym mapping such that, when the at least one record includes the second token, the second token is automatically replaced with the first token.

The executable instructions may be configured to cause the at least one processor to perform one or more of the above/below features (or any combination thereof). The token synonym mapping may include context data associated with the second token, and the context data has a first context token and a second context token. The executable instructions cause the at least one processor to replace the second token with the first token if the at least one record also includes at least one of the first context token and the second context token. The executable instructions cause the at least one processor to automatically abbreviate text within a new record based on the token synonym mapping, where the text includes a word associated with the first token, and the executable instructions cause the at least one processor to replace the word with an abbreviation associated with the second token such that the text can fit within a fixed length of the record. The executable instructions cause the at least one processor to automatically abbreviate the text in real time as a user is typing the text of the record. The executable instructions cause the at least one processor to calculate confidence levels for terms within the new record on a level of similarity of the new record to existing records in the database, and determine to replace the first word with the abbreviation based on its confidence level being higher than a confidence level associated with another term included within the new record. The executable instructions cause the at least one processor to apply a synonym algorithm on groups of tokens from the plurality of records of the database to identify that the second token is a synonym of the first token.

In some examples, a method for automatically identifying synonyms within a token-based data management system includes creating a token synonym mapping by automatically identifying token synonyms within a plurality of records stored in a database based on a statistical analysis of the plurality of records, where the token synonym mapping includes a first token linked to a second token, and the second token is a valid synonym of the first token, and standardizing at least one record of the plurality of records based on the token synonym mapping such that, when the at least one record includes the second token, the second token is automatically replaced with the first token.

The method may include one or more of the following features (or any combination thereof). The token synonym mapping may include context data associated with the second token, and the context data has a first context token and a second context token. The method may include replacing the second token with the first token if the at least one record also includes at least one of the first context token and the second context token. The method may include automatically abbreviating text within a new record based on the token synonym mapping, where the text includes a word associated with the first token, and replacing the word with an abbreviation associated with the second token such that the text can fit within a fixed length of the record. The text may be automatically abbreviated in real time as a user is typing the text of the record. The method may include determining whether a current record is similar to one or more other records in the database based on a token-record mapping of tokens to records, updating the token-record mapping based on the identified token synonyms, identifying a token of the current record as unimportant based on token importance values of the tokens of the current record, removing the unimportant token from the updated token-record mapping, selecting only records sharing at least one common token with the current record such that the at least one common token does not include the token identified as unimportant, and comparing the current record with each of the selected records to determine whether the current record matches any of the selected records. The creating the token synonym mapping may include applying a synonym algorithm on groups of tokens from the plurality of records of the database to identify that the second token is a synonym of the first token.

The details of one or more implementations are set forth in the accompanying drawings and the description below. Other features will be apparent from the description and drawings, and from the claims.

BRIEF DESCRIPTION OF THE DRAWINGS

FIG. 5 illustrates tokenized records according to an implementation.

FIG. 6 illustrates groups of coincident tokens by record in groups of N according to an implementation.

FIG. 7 illustrates groups of coincident token groups based on N−1 tokens according to an implementation.

FIG. 8 illustrates groups of tokens not used to form the groups according to an implementation.

DETAILED DESCRIPTION

Figure 1:
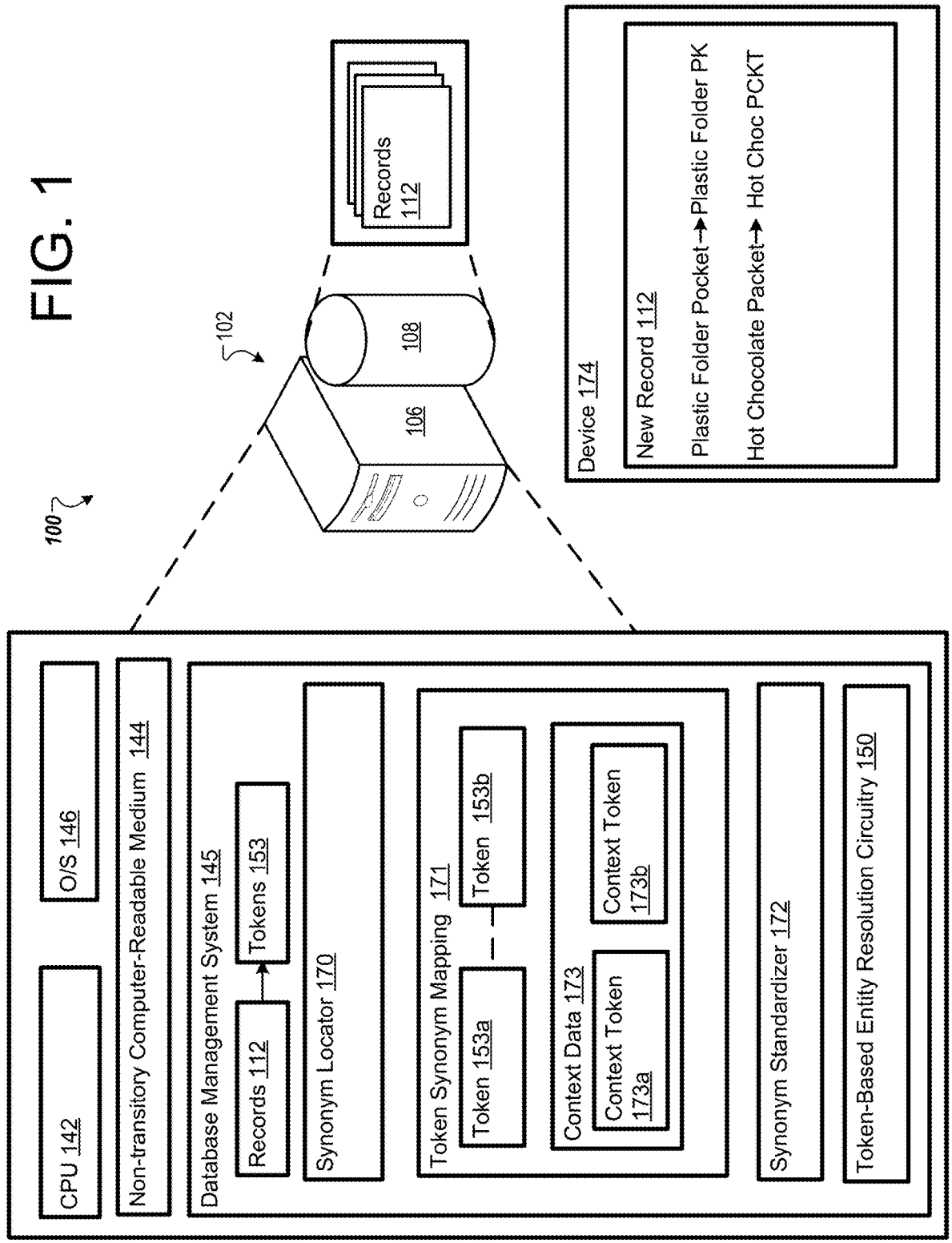
FIG. 1 is a diagram of an example system for automatically locating synonyms within a database that stores records according to an implementation.

The embodiments provide a system for automatically generating standard synonyms for use within a database management system without using a predefined dictionary or predefined abbreviation rules. Rather, the system uses the existing corpus of records as a source of statistically valid synonyms. For example, the system statistically analyzes all the records of a database to determine whether particular terms (tokens) have valid synonyms (e.g., abbreviations). In particular, the system may analyze the terms of the records to identify synonyms, as well as their context clues which provide evidence that a particular synonym is valid. For example, the system may locate records with ACNE CONTROL CREAM and records with ACNE CON CREAM. The system may determine that, in the context of ACNE and CREAM, CON is a valid synonym for the term CONTROL. Similarly, the system may locate records with SOFT CON LENSES and records with SOFT CONTACT LENSES. The system may determine that, in the context of SOFT and LENSES, CON is a valid synonym for CONTACT. The system may create a token synonym mapping that maps each synonym with its corresponding item, and links the context data (e.g., context clues) with each term-synonym pair (or grouping).

The system may automatically standardize terms across the records of the database based on the token synonym mapping. For example, the system may automatically replace CON with CONTROL if the record also includes the context clues of ACNE and CREAM, and may automatically replace CON with CONTACT if the record also includes the context clues of SOFT and LENSES. In one example, when a user is searching the records of the database (or the system is de-duplicating records), the system can locate records even though they have abbreviated terms, and the system can intelligently disambiguate the terms based on the token synonym mapping. In this manner, various terms of the database may be standardized, which can decrease the inconsistencies within the records and improve the accuracy of record matching. In some examples, the system may replace or suggest an abbreviation for a term entered by the user (in real-time or near real time) when creating a new record. For example, a record may have a fixed length, and the entire description may not fit within the length of the record. In this example, the system may automatically replace or suggest valid abbreviations for one or more of the terms in the newly entered description based on the token synonym mapping such that the description can fit within the fixed length of the record.

For example, when the user is entering a new description, and needs to abbreviate a term in that description, the system may analyze the newly entered description and compare the description to other similar existing records that contain an abbreviation for a term in the newly entered description. The system may calculate a confidence based on how similar the existing records are to the new record (e.g., how much context they share), how conventional the abbreviation is, and how many existing records share the same abbreviation. In essence, the system may allow the existing records to "vote" on the best abbreviation for the term in a given context. In this way, the system can, in real time, suggest the most accepted abbreviations anywhere within the description while it is being entered so as to minimize the inconsistencies with the existing dataset.

FIG. 1 is a diagram of an example system 100 for automatically locating synonyms within a database 108 storing records 112 according to an implementation.

The system 100 can include one or more computer systems (e.g., computer system 102). The computer system 102 can include one or more computing devices 106 and one or more computer-readable storage devices (e.g., database(s) 108). The computing device 106 can include one or more processors (e.g., CPU 142), and one or more memory devices (e.g., non-transitory computer-readable medium 144) storing executable instructions that cause the CPU 142 to perform the operations discussed herein. The computing device 106 may include an operating system (O/S) 146. The non-transitory computer-readable medium 144 may include one or more non-volatile memories, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The CPU 142 may include any type of special purpose logic circuitry, e.g., an FPGA (field programmable gate array) or an ASIC (application-specific integrated circuit). The CPU 142 may include one or more processors coupled to a semi-conductor substrate. Also, the system 100 may include various application programming interfaces (APIs) in a manner that permits the system 100 to communicate with other systems, applications, or devices (e.g., device 174), or permits the computing device 106 to communicate with the database 108. In some examples, the API is SQL, a standard programming language for defining, protecting, and accessing data in the database 108. The computing device 106 can represent or more server computers that interact with client devices (e.g., device 174) over a network.

Figure 9:
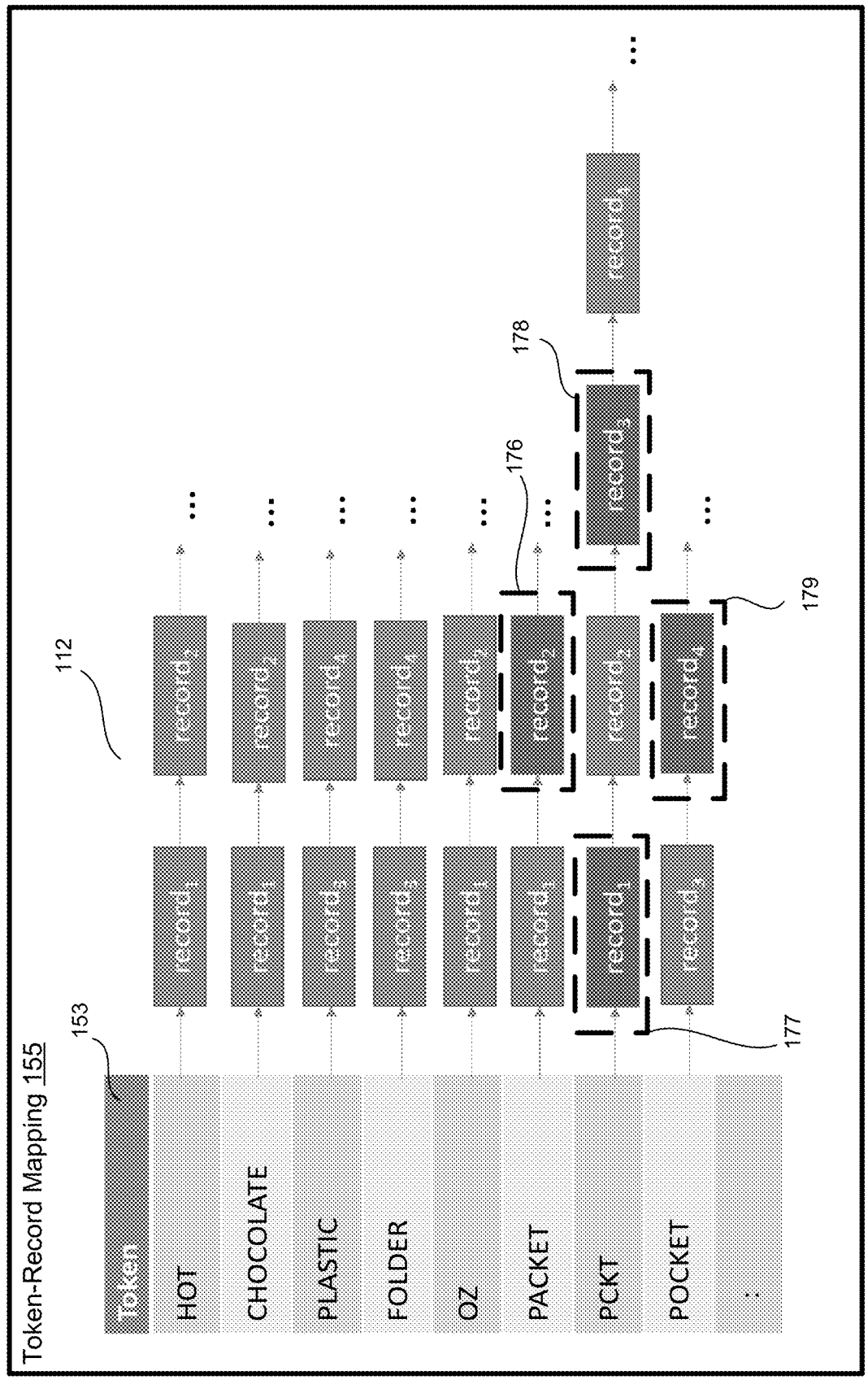
FIG. 9 illustrates an updated token-record mapping having new synonym records according to an implementation.

The computing device 106 includes a database management system 145. The database management system 145 may be a computer software application (implemented by the CPU 142 and the non-transitory computer-readable medium 144) that interacts with users (e.g., a user executing device 174), other applications, and the database 108 to capture and data. The database management system 145 may allow the definition, creation, querying, update, and administration of the database 108. In some examples, the database management system 145 is an in-memory database system (an example of which is illustrated in FIG. 9). In some examples, the database management system 145 is a columnar database management system. In some examples, the database management system 145 is a cloud-based database management system.

The database 108 may store data in the form of records 112. The database 108 may be a single storage device or a collection of multiple storage devices that are managed by the database management system 145. The database 108 may be one or more relational databases. In some examples, the database 108 may be a distributed storage system (e.g., Hadoop). In some examples, the database 108 may be in-memory database, columnar database, and/or a cloud-based database (or a combination of two or more of them). In some examples, incoming records 112 may be inputted to the system 100 from users, systems or other sources through an application programming interface (API), imported programmatically, entered through an input device, or imported from one or more databases. Though FIG. 1 shows a computer system 102, the system 100 may include additional computer systems. The computer systems may be included as part of larger systems for managing records of one or more enterprises. For example, a computer system may be part of or included in a larger machine or system. The computer systems may be located in a same location or in different locations.

The records 112 may be a collection of data items (or single data item) arranged for processing by the database management system 145. In some examples, each record 112 may be of a fixed length. In other examples, some of the records 112 may be of a variable length. In some examples, the records 112 may be rows within one or more tables. In other examples, the records 112 may be columns within one or tables. Each record 112 may store text data such as words, letters, abbreviations, numbers, symbols, and/or special characters. In some examples, the records 112 may include free-form data having an unstructured data format (e.g., without restrictions to form). For instance, when creating a record 112, the database 108 (or portion thereof) may accept all forms of text data (e.g., a record is not restricted to certain types of data).

In some examples, each record 112 includes free-form data with a fixed length, which may cause the system 100 to use shortened terms, synonyms, abbreviations, etc., as further described below. In some examples, the records 112 may include both free-form data and structured data. In some examples, the records 112 only include records having free-form data. In some examples, the records 112 include product or material data associated with an enterprise. In one example, a first record includes a product definition that refers to product A, and a second record includes a product definition that also refers to product A. The product definition of the first record may include the exact description (or similar description) as the product definition of the second record. The first record and the second record may be two records of thousands or millions of records 112 stored in the database 108, but the database management system 145 may reduce the amount of comparisons needed in order to identify the first and second records as the same (or similar to each).

The database management system 145 may be configured to create one or more tokens 153 from each record 112 (as further described with reference to FIG. 2). Each token 153 may include a term from the record 112, and the term may include a word, one or two letters, one or more symbols, one or more numbers, and/or one or more special characters.

The database management system 145 may include a synonym locator 170 configured to create a token synonym mapping 171 by automatically identifying token synonyms within the plurality of records 112 based on a statistical analysis of the plurality of records 112. The operations of the synonym locator 170 are further explained with reference to FIG. 4. The token synonyms may be two or more differently-worded tokens 153 that actually refer to the same token. The token synonym mapping 171 may identify that token 153b is a valid synonym of token 153a. In some examples, token 153b is an abbreviation of token 153a. The synonym locator 170 can automatically identify that token CON is a valid synonym (abbreviation) for the token CONTOL (or vice versa). In other examples, token 153b is a different term or word that has the same meaning as token 153a. Although one set of token synonyms is illustrated in FIG. 1 (e.g., token 153a, 153b), the system 100 may automatically identify a number of sets of token 153a and 153b (collectively referred to as token synonyms or individually as a token synonym), and a particular token 153a may have multiple valid synonyms such as two or more tokens 153b.

The synonym locator 170 may create the token synonym mapping 171 by linking token synonyms together, e.g., linking token 153b (also referred to as the second token) to token 153a (also referred to as the first token). Also, the synonym locator 170 may identify context data 173 associated with the token synonyms, and include the context data 173 within the token synonym mapping 171, where the context data 173 is linked to token 153a and/or token 153b. The context data 173 may provide context clues when a particular token synonym is appropriate. For example, with respect with token 153b, the context data 173 may include a context token 173a and a context token 173b.

In one example, the synonym locator 170 may statistically analyse the records 112 and locate records with ACNE CONTROL CREAM and records with ACNE CON CREAM. Based on the statistical analysis, the synonym locator 170 may identify token CON (token 153b) as a valid abbreviation for the token CONTROL (token 153a) in the context of ACNE (context token 173a) and CREAM (context token 173b). The token synonym mapping 171 may link token CONTROL (token 153a) to token CON (token 153b), where CON is a valid synonym (e.g., abbreviation) of CONTROL. Also, the token synonym mapping 171 may include the context data 173 that is linked (or associated) with the token CON (token 153b) and/or the token CONTROL (token 153a). The context data 173 may include ACNE (context token 173a) and CREAM (context token 173b).

In another example, the synonym locator 170 may statistically analyse the records 112 and locate records with SOFT CONTACT LENSES and records with SOFT CON LENSES. Based on the statistical analysis, the synonym locator 170 may identify token CON (token 153b) as a valid abbreviation for the token CONTACT (token 153a) in the context of SOFT (context token 173a) and LENSES (context token 173b). The token synonym mapping 171 may link token CONTACT (token 153a) to token CON (token 153b), where CON is a valid synonym (e.g., abbreviation) of CONTACT. Also, the token synonym mapping 171 may include the context data 173 that is linked (or associated) with the token CON (token 153b) and/or the token CONTACT (token 153a). The context data 173 may include SOFT (context token 173a) and LENSES (context token 173b).

The database management system 145 may include a synonym standardizer 172 configured to standardize at least one record 112 of the records 112 of the database 108 based on the token synonym mapping 171 such that, when at least one record 112 includes token 153b, the synonym standardizer 172 is configured to automatically replace token 153b with token 153a (or vice versa). The synonym standardizer 172 standardizes records 112 in the sense that it makes inconsistent terms within the database 108 consistent, which can improve record matching. When the database management system 145 receives a query for a certain record (or attempts to match a particular record with other records 112 of the database 108), the synonym standardizer 172 may intelligently disambiguate the terms based on the token synonym mapping 171.

Continuing with the above example, when querying the database 108 for ACNE CONTOL CREAM, the database management system 145 may retrieve the records with ACNE CONTROL CREAM and records with ACNE CON CREAM, because the synonym standardizer 172 may be invoked to automatically replace CON with CONTROL for the records having ACNE CON CREAM. Also, by using the context data 173, the synonym standardizer 172 would not replace the term CON with CONTACT because the context data 173 for CON/CONTROL is ACNE and CREAM. For example, the synonym standardizer 172 may replace CON (token 153b) with CONTROL (token 153a) because the records also include the ACNE (context token 173a) and CREAM (context token 173b).

In some examples, the synonym standardizer 172 is configured to automatically abbreviate text within a new record 112 based on the token synonym mapping 171, wherein the text includes a word associated with token 153a, and the synonym standardizer 172 is configured to replace the word with an abbreviation associated with token 153b such that the text can fit within a fixed length of the new record 112. For example, the synonym standardizer 172 can replace or suggest a term within a description of a new record 112 with its valid synonym based on the token synonyms identified by the synonym locator 170. For example, during record creation, a user may enter a description for a new record 112. The record 112 may be of a fixed length. However, the description that the user wants to enter is longer than the length of the record 112. The synonym standardizer 172 may analyse and tokenize the description and determine that one of the tokens is the token synonyms, and may replace that token with its abbreviation such that the description may fit within the fixed length of the record 112.

For example, as shown in FIG. 1, the synonym locator 170 may automatically identify that the token PK is a synonym of the token Pocket. When a user is operating the device 174 to create a new record 112, the user may type the description "Plastic Folder Pocket." In some examples, the description "Plastic Folder Pocket" may be longer than the fixed length of the record 112. Based on the token synonym mapping 171, the synonym standardizer 172 may determine that PK is a valid abbreviation for the token Pocket with context clues "Plastic" (token 173a) and "Folder" (token 173b), and replace the term Pocket with PK (or provide a suggestion to the user). Also, when a user is operating device 174 to create a new record 112, the user may type the description "Hot Chocolate Packet." In some examples, the description "Hot Chocolate Packet" may be longer than the fixed length of the record 112. Based on the token synonym mapping 171, the synonym standardizer 172 may determine that "Choc" is a valid abbreviation for the token "Chocolate", and that "PCKT" is a valid abbreviation for the token "Packet" with context clues "Chocolate" (token 173a) and "Hot" (token 173b). In this manner, new records 112 may be added with abbreviations that are consistent across the records 112 of the database 108, thereby avoiding ambiguity in abbreviations, which can improve the performance of the system 100 itself.

The synonym standardizer 172 may automatically abbreviate text within the new record 112 to any length by replacing a long token with a shorter synonym. For example, the synonym standardizer 172 may automatically abbreviate the term CHOCOLATE to CHOC, or automatically abbreviate the term PACKET to PCKT or PK, in order to fit within a fixed length record. The synonym standardizer 172 may loop through the tokens in a record in a specific order, replacing long tokens with a shorter synonym, until it complies with the desired length. In some examples, the order could be longest tokens first, least important tokens first, last word first, etc. In some examples, the synonym standardizer 172 may perform this process in real time as the user is typing the description in the record 112.

Also, in some examples, when the user is entering a new description, and needs to abbreviate a term in that description, the synonym standardizer 172 may analyze the newly entered description and compare the description to other similar existing records 112 that contain an abbreviation for a term in the newly entered description. The synonym standardizer 172 may calculate a confidence based on the level of similarity between the new record and the existing records (e.g., how much context they share, how conventional the abbreviation is, and how many existing records 112 share the same abbreviation), and select one or more tokens 153 to abbreviate based on the confidence level(s) (e.g., the confidence level of a term-abbreviation pair being above a threshold level or being above one or more other term-abbreviation pairs included within the new record). In essence, the synonym standardizer 172 may allow the existing records to "vote" on the best abbreviation for the term in a given context. In this way, the synonym standardizer 172 can, in real time, suggest the most accepted abbreviations anywhere within the description while it is being entered so as to minimize the inconsistencies with the existing records 112. These aspects are further explained with reference to FIGS. 8 and 10.

The database management system 145 may include a token-based entity resolution circuitry 150 configured to perform token-based entity resolution operations to identify whether a current record 112 is the same or similar to other records 112 of the database 108 in a manner that reduces the amount of comparisons, thereby decreasing the amount of resources needed by the system 100. In addition, the token-based entity resolution circuitry 150 may be enhanced with the token synonym mapping 171 in order to increase the accuracy of the system 100, as further described below.

The token-based entity resolution circuitry 150 may be defined by the CPU 142 and the memory 144 which stores executable instructions (that when executed by the CPU 142) causes the CPU 142 to perform the token-based entity resolution operations discussed herein. Because the database 108 may store a relatively large number of records 112 (e.g., thousands/millions of records 112), it would be impossible to manually compare each record to every other record within the database 108 to find which records are similar to each other. Furthermore, the conventional approaches to entity resolution can be computationally demanding, thereby time consuming, particularly at large scales. However, the token-based entity resolution described herein improves the performance of the system 100 itself by reducing the number of comparisons made during entity resolution, thereby decreasing the amount of resources required by the computing device 106 (e.g., may decrease the amount of processing power and memory of the CPU 142 and the memory 144). Also, as further described below, the token-based entity resolution circuitry 150 may use the token synonym mapping 171 to adjust the token-record mapping, thereby increasing the accuracy of locating similar records 112.

Figure 2:
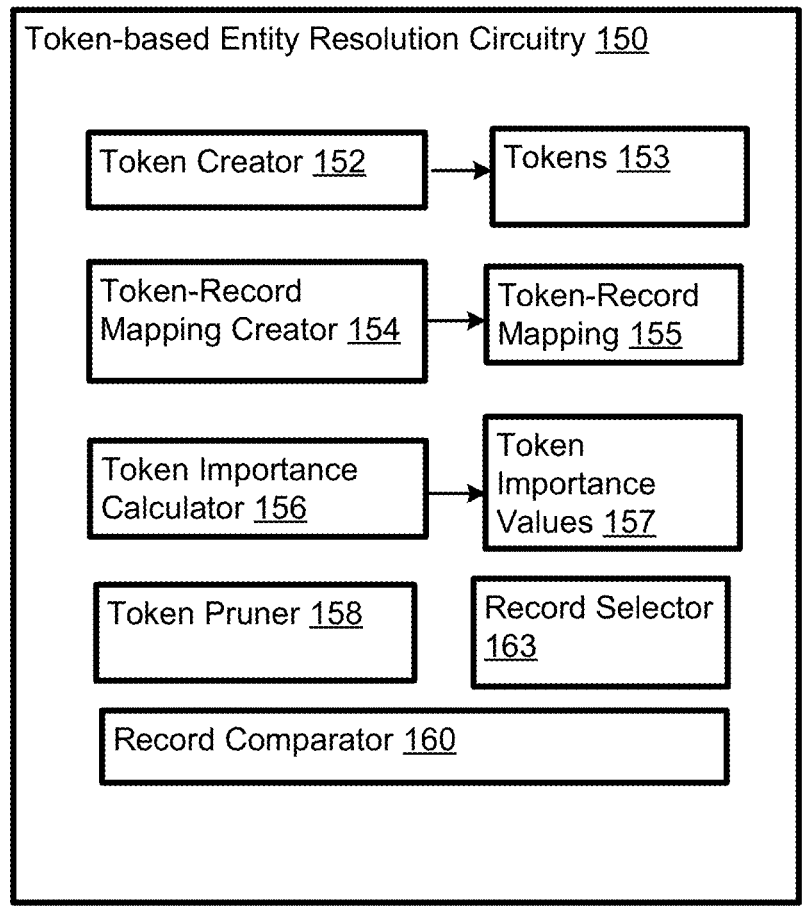
FIG. 2 illustrates a diagram of token-based entity resolution circuitry of FIG. 1 according to an implementation.

FIG. 2 illustrates a diagram of the token-based entity resolution circuitry 150 of FIG. 1 according to an implementation. The token-based entity resolution circuitry 150 may include a plurality of sub-components such as a token creator 152 configured to create tokens 153 from the records 112 of the database 108, a token-record mapping creator 154 configured to create a token-record mapping 155 that maps tokens 153 to records 112, and a token importance calculator 156 configured to calculate token importance values 157 for the tokens 153.

The token creator 152 may create tokens 153 for each record 112. The token creator 152 may perform natural language processing (NLP) to split the values of a respective record 112 into individual tokens 153. For example, the token creator 152 may split a particular record 112 based on natural character boundaries (e.g. whitespace, transition between digits and letters, etc.) to produce the tokens 153 associated with that record 112. The token creator 152 may create one or a plurality of tokens 153 for a single record 112. The type(s) of NLP(s) used to create the tokens 153 may widely vary depending on the type of underlying data. Each token 153 may include a term from the record 112, and the term may include a word, one or two letters, one or more symbols, one or more numbers, and/or one or more special characters.

The token-record mapping creator 154 may create a token-record mapping 155 by mapping records 112 to token 153. For example, the token-record mapping creator 154 may perform record linkage to link the records 112 to the tokens 153. In a simple example, a first record may have token A and token B, and a second record may have only token A. The token-record mapping creator 154 may link the first and second records to token A (because the first and second records have token A), and may link the first record to token B. The token-record mapping 155 may be expressed in a data structure that identifies each token 153 created from the records 112, and one or more links that point to the record(s) 112 having the corresponding token 153. In some examples, the token-record mapping 155 recites an index of tokens 153 and the identifiers of the linked records 112 (e.g., a numerical number that uniquely identifies records) are linked to their respective tokens 153.

The token-based entity resolution circuitry 150 may update the token-record mapping 155 based on the token synonym mapping 171. For example, a first record may include token 153$a$ (and other tokens 153), and a second record may include token 153$b$ (and other tokens 153). Token 153$a$ is linked the first record (as well as other records 112 that have token 153$a$), and token 153$b$ is linked to the second record (as well as other records 112 that have token 153$b$). However, based on the token synonym mapping 171, the token-record mapping creator 154 may determine that token 153$b$ is a synonym of token 153$a$, and may update the token-record mapping 155 to also link the second record to token 153$a$, and the third record to token 153$b$. By incorporating the token synonym mapping 171 into the token-record mapping, accuracy of the token-based entity resolution approach may be increased.

The token importance calculator 156 may calculate token importance values 157 for the tokens 153. For instance, the token importance calculator 156 may calculate a token importance value 157 for each of the tokens 153. The token importance value 157 may be a numerical statistic that reflects how important the token 153 is to its record in a corpus of records (e.g., the records 112 in the database 108). The token importance value 157 may be a term frequency-inverse document frequency (tf-idf) value. For example, the token importance value 157 may indicate a measure of how much information the token provides, that is, whether the token is common or rare across all records 112. In some examples, the token importance calculator 156 determines the logarithmically scaled inverse fraction of the records 112, obtained by dividing the total number of records 112 by the number of records 112 containing that token, and then taking the logarithm of that quotient. However, the token importance calculator 156 may use any type of tf-idf calculations known to one of ordinary skill in the art to calculate a tf-idf value. The token importance values 157 may be within a range such as 0 to 100 (for example). In some examples, a relatively low token importance value (e.g., 2) may indicate that the token is frequently occurring, and a relatively high token importance value (e.g., 90) may indicate that the token is infrequently occurring. In some examples, the token importance value 157 may increase proportionally to the number of times the token 153 appears in the record, but is offset by the frequency of the token 153 in the corpus of records 112.

The token-based entity resolution circuitry 150 may also include a token pruner 158, a record selector 163, and a record comparator 160. For example, when evaluating a current record to be matched during entity resolution, the token pruner 158 may identify any unimportant tokens from the tokens 153 of the current record based on the token importance values 157 of the current record, and then remove the unimportant tokens from the token-record mapping 155 such that the unimportant tokens are not used when retrieving records 112 against which to compare to the current record.

In particular, the token pruner 158 may compare the token importance values 157 contained within the current record 112 to identify whether the current record 112 includes any unimportant tokens. Those tokens 153 whose token importance values 157 falls below a predetermined threshold relative to the largest token importance value found within the current record 112 may be considered unimportant, and are not used when retrieving records 112 against which to compare to the current record 112. Also, records 112 containing only frequently occurring tokens or only infrequently occurring tokens will have of their tokens 153 used since all of the token importance values 157 will be similar. This is, all of the token importance values 157 will be above the predetermined threshold relative to the largest token importance value found within the current record 112 indicating that all of the tokens 153 within the current record 112 are similar or the same in relative importance. Restricting record comparisons in this way reduces the resource requirements of the comparison without significantly affecting the results.

In one example, when evaluating a current record having tokens CHOCOLATE, OZ, and PACKET, the token pruner 158 identifies the most important token as the CHOCOLATE token since its token importance value of 92 is the highest among all the token importance values of the current record. Then, the token pruner 158 may mark as unimportant those tokens 153 whose token importance value 157 is less than the most important token within the current record by some percentage (e.g., 67%). However, the predefined threshold or percentage may encompass any type of value, and may depend on the underlying data stored in the records 112. In this case, the token pruner 158 identifies any tokens (within the current record) having a token importance value of less than 30.36 as unimportant. If the OZ and PACKET tokens have token importance values 157 of less than 30.36, the OZ token and the PACKET token are identified as unimportant in the context of the current record.

However, if the PACKET token has a token importance value of greater than 30.36, the PACKET token is not identified as unimportant, and therefore is used to select record 112 for comparison. In addition, by incorporating the token synonym mapping 171, the token that are synonyms are also include in the record selection (e.g., it would also use PCKT or PK).

The record selector 163 is configured to select only the records 112 in the database 108 that share at least one common token with the current record such that the at least one common token does not include any of the tokens 153 identified as unimportant. In this manner, the number of comparisons may be reduced.

The record comparator 160 may compare the current record to each of the selected records (selected by the record selector 163) using a similarity or comparison analysis. The record comparator 160 may utilize any type of similarity or comparison analysis to perform the comparison such as a Jaccard Index-based comparison. For instance, the record selector 163 may select all of the records that share at least one common token (one common token or two or more common tokens) with the current record, but since the records selector 163 ignores or disregards the records 112 linked to the unimportant tokens 153, the number of records 112 selected for comparison by the record comparator 160 is reduced. In some examples, the similarity or comparison analysis may be relatively computationally expensive, and therefore reducing the amount of comparisons performed by the record comparator 160 can increase the speed of the system 100 and/or decrease the amount of resources needed to perform entity resolution of the records 112 of the database 108.

Figure 3:
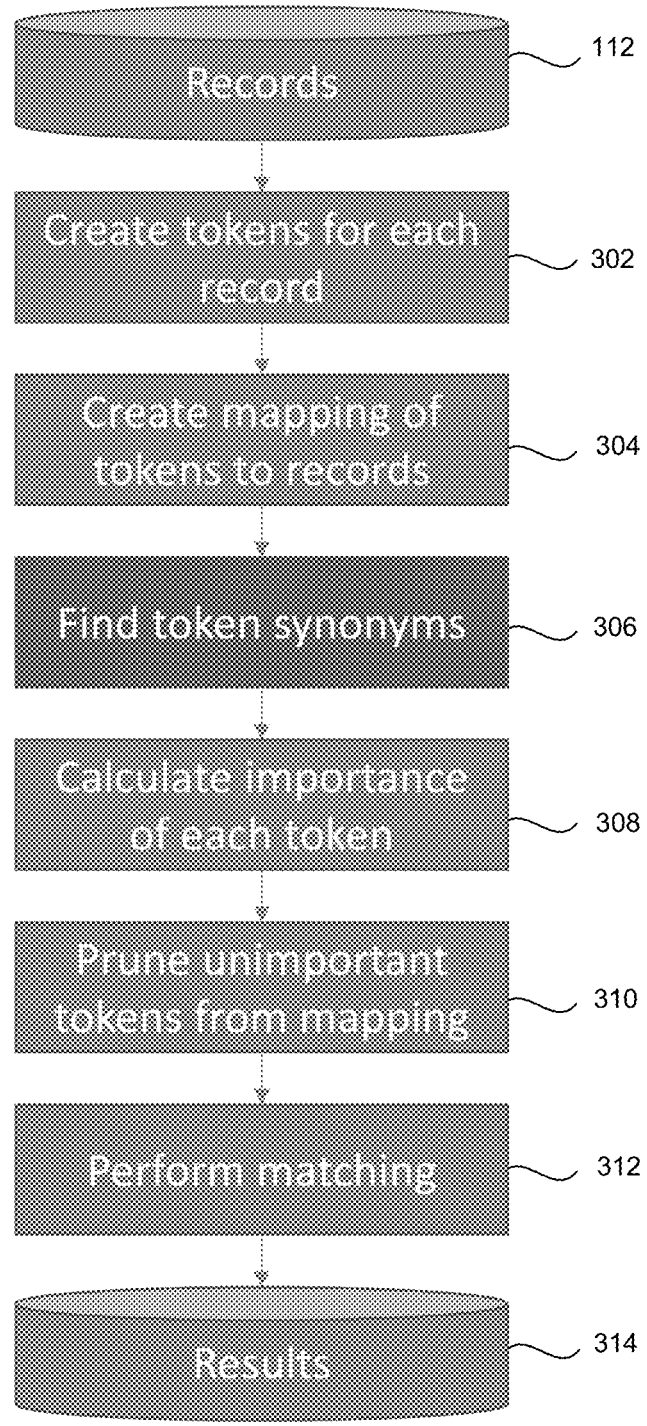
FIG. 3 illustrates example operations of a flowchart for performing token-based entity resolution using token synonyms to reduce the amount of comparisons and increase the accuracy of the system according to an implementation.

FIG. 3 illustrates example operations of a flowchart 300 for performing token-based entity resolution using token synonyms to reduce the amount of comparisons and increase the accuracy of the system according to an implementation. Although FIG. 3 is illustrated as a sequential, ordered listing of operations, it will be appreciated that some or all of the operations may occur in a different order, or in parallel, or iteratively, or may overlap in time.

Tokens may be created for each record (operation 302). For example, the token creator 152 may create tokens 153 for each record 112. A mapping of tokens to records may be created (operation 304). For example, the token-record mapping creator 154 may create a token-record mapping 155 by mapping records 112 to token 153. In a simple example, a first record may have token A and token B, and a second record may have only token A. The token-record mapping creator 154 may link the first and second records to token A (because the first and second records have token A), and may link the first record to token B. The token-record mapping 155 may be expressed in a data structure that identifies each token 153 created from the records 112, and one or more links that point to the record(s) 112 having the corresponding token 153. In some examples, the token-record mapping 155 recites an index of tokens 153 and the identifiers of the linked records 112 (e.g., a numerical number that uniquely identifies records) are linked to their respective tokens 153.

Token synonyms may be found (operation 306). For example, the synonym locator 170 may automatically identify token synonyms among the records 112, e.g., two or more differently-worded tokens that actually refer to the same token. For example, the synonym locator 170 may identify that token 153$b$ is a valid synonym of token 153$a$. The token-based entity resolution circuitry 150 may update the token-record mapping 155 based on the token synonym mapping 171. For example, a first record may include token 153$a$ (and other tokens 153), and a second record may include token 153$b$ (and other tokens 153). Token 153$a$ is linked to the first record (as well as other records 112 that have token 153$a$), and token 153$b$ is linked to the second record (as well as other records 112 that have token 153$b$). However, based on the token synonym mapping 171, the token-record mapping creator 154 may determine that token 153$b$ is a synonym of token 153$a$, and may update the token-record mapping to also link the second record to token 153$a$, and the third record to token 153$b$. By incorporating the token synonym mapping 171 into the token-record mapping, accuracy of the token-based entity resolution approach may be increased.

Importance of each token may be calculated (operation 308). For example, the token importance calculator 156 may calculate token importance values 157 for the tokens 153.

Unimportant tokens records may be pruned from the mapping (operation 310). For example, when evaluating a current record to be matched during entity resolution, the token pruner 158 may identify any unimportant tokens from the tokens 153 of the current record based on the token importance values 157 of the current record, and then remove the unimportant tokens from the token-record mapping 155 such that the unimportant tokens are not used when retrieving records 112 against which to compare to the current record. The record selector 163 is configured to select only the records 112 in the database 108 that share at least one common token with the current record such that the at least one common token does not include any of the tokens 153 identified as unimportant. In this manner, the number of comparisons may be reduced.

Matching may be performed (operation 312), and results may be stored (operation 314). For example, the record comparator 160 may compare the current record to each of the selected records (selected by the record selector 163) using a similarity or comparison analysis. The record comparator 160 may utilize any type of similarity or comparison analysis to perform the comparison such as a Jaccard Index-based comparison. For instance, the record selector 163 may select all of the records that share at least one common token (one common token or two or more common tokens) with the current record, but since the records selector 163 ignores or disregards the records 112 linked to the unimportant tokens 153, the number of records 112 selected for comparison by the record comparator 160 is reduced.

Figure 4:
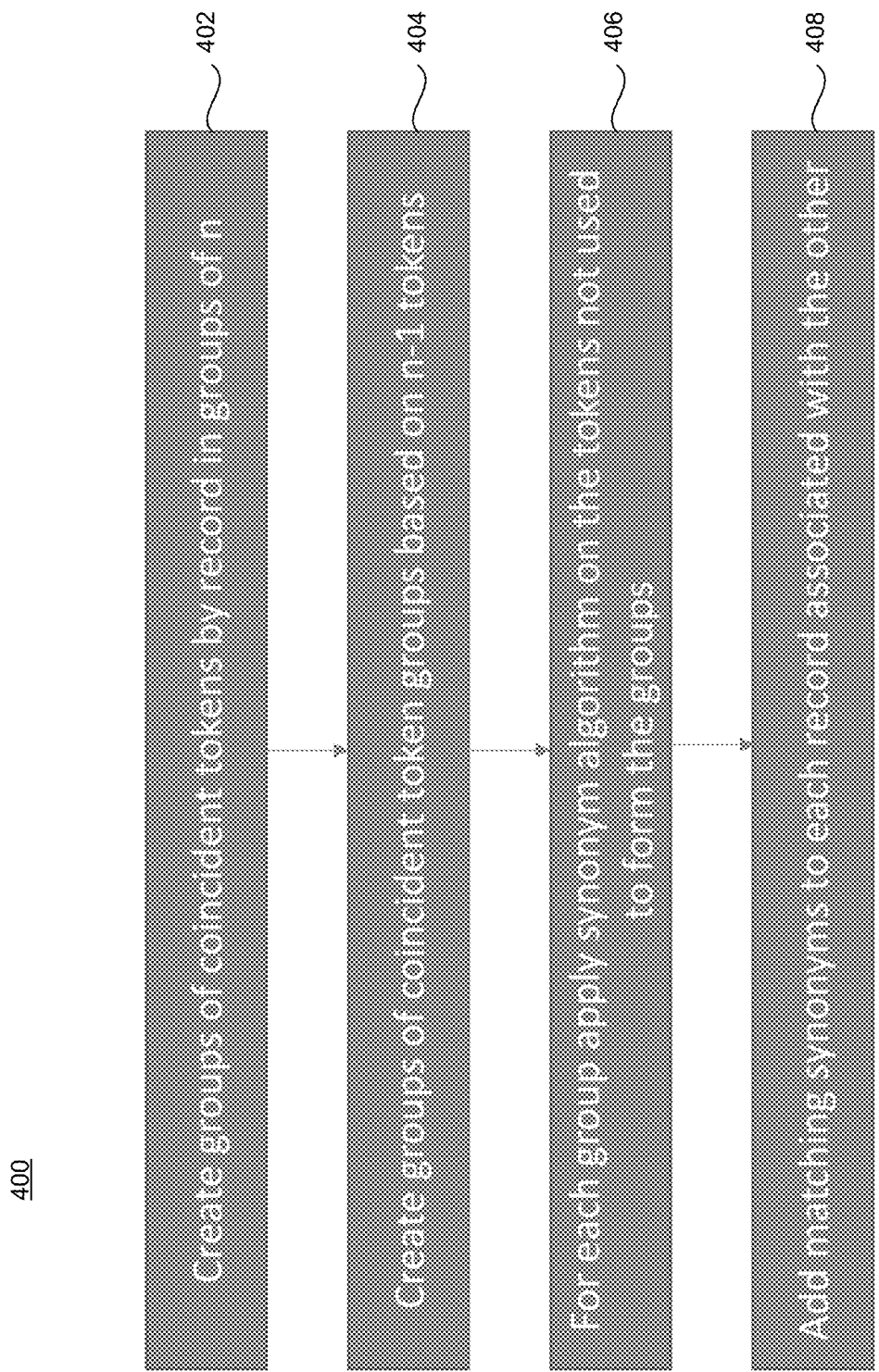
FIG. 4 illustrates example operations of a flowchart for automatically locating synonyms in the records of the database according to an implementation.

FIG. 4 illustrates example operations of a flowchart 400 for automatically locating synonyms in the records 112 of the database 108 according to an implementation. Although FIG. 4 is illustrated as a sequential, ordered listing of operations, it will be appreciated that some or all of the operations may occur in a different order, or in parallel, or iteratively, or may overlap in time.

The flowchart 400 is also explained with reference to FIGS. 5-9. FIG. 5 illustrates tokenized records according to an implementation. For example, FIG. 5 illustrates a first record 112-1, a second record 112-2, a third record 112-3, and a fourth record 112-4. The first record 112-1 is tokenized into the following tokens: HOT, CHOCOLATE, 12, OZ, PACKET. The second record 112-2 is tokenized into the following tokens: HOT, CHOCOLATE, 12, OZ, PCKT. The third record 112-3 is tokenized into the following tokens: PLASTIC, POCKET, FOLDER. The fourth record 112-4 is tokenized into the following tokens: PLASTIC, PCKT, FOLDER. The operations of the flowchart 400 depict how the synonym locator 170 can identify the token PCKT as a valid synonym for the token PACKET, and the token PCKT as a valid synonym for the token POCKET within the records 112 (which may be in the thousands or millions) without using a predefined dictionary.

Groups of coincident tokens by record in groups of n may be created (operation 402). Referring to FIGS. 1 and 6, the synonym locator 170 may create groups 600 of coincident tokens by record in groups of N. In the example of FIG. 6, N is equal to three. However, the embodiments encompass the situation of N is different than three (e.g., 2 or 4, or more than 4). For example, with respect to the first record 112-1, the synonym locator 170 may create groups of three tokens from the record 112 in various combinations. In particular, the first group includes the tokens HOT, CHOCOLATE, and PACKET, the second group includes the tokens HOT, CHOCOLATE, and OZ, the third group includes the tokens HOT, CHOCOLATE, 12, the fourth group includes the tokens HOT, OZ, PACKET, and the fifth group includes the tokens HOT OZ, 12. It is noted that FIG. 6 includes only a subset of the total number of groups for the first record 112-1. The same process is repeated for the second record 112-2, the third record 112-3, and the fourth record 112-4 (although not entirely shown in FIG. 6 for the sake of brevity), as well as for all the other records 112 in the database 108.

Groups of coincident token groups based on n−1 tokens may be created (operation 404), and for each group, a synonym algorithm may be applied on the tokens not used to form the groups (operation 406). Referring to FIGS. 1 and 7, the synonym locator 170 may create groups 700 of coincident token groups based on n−1 tokens. In the example of FIG. 7, since N is equal to three, the groups 700 are formed based on various combinations of Token2 and Token3. For example, FIG. 7 shows three examples groups of records (701, 702, 703), each of which share a common N−1 tokens, and one uncommon token (in this example, N=3). For instance, all of the token groups in group 701 have HOT and CHOCOLATE. The synonym locator 170 then collects all of the third tokens into a set: PACKET, OZ, 12, PCKT. The synonym locator 170 then applies predefined heuristics (e.g., the synonym algorithm) to identify potential synonyms within this set. The heuristics include, but are not limited to, simple prefixing, letter removal, acronym substitution, etc. In this example, the synonym locator 170 executing the heuristics would identify PCKT⇔PACKET as a potential synonym pair, but would disregard OZ⇔PACKET, 12⇔PACKET, OZ⇔12, etc., since they do not follow any known heuristic for abbreviation.

FIG. 8 shows the result of this synonym algorithm as applied to FIG. 7. For example, referring to FIG. 8, for each group of 600 and 700, the synonym locator 170 applies synonym algorithm (as described above) on the tokens not used to form the groups 600, 700. As a result of applying the synonym algorithm on the tokens not used to form the groups 600, 700, the synonym locator 170 may locate synonyms among the records 112, e.g., the token PCKT is a valid synonym for the token PACKET, the token PCKT is a valid synonym for the token PACKET, and the token POCKET is a valid synonym for the token PCKT. Also, it is noted that the structure of FIG. 8 can also be used for automatic standardization, correctly disambiguating abbreviated terms. For example, HOT CHOCOLATE 12 OZ PCKT can be standardized confidently to HOT CHOCOLATE 12 OZ PACKET because the context clues of HOT, OZ and HOT, CHOCOLATE indicate to select PACKET rather than POCKET.

Matching synonyms to each record associated with the other may be added (operation 408). The synonym locator 170 may add matching synonyms to each record associated with the other, as shown in FIG. 9. The synonym locator 170 may update the token-record mapping 155 to link the synonyms to the appropriate records 112. In this example, the synonym locator 170 added records 176-179 to the token-record mapping 155. The token-record mapping 155 includes an index of tokens 153, and links to the records 112 that have those tokens 153. For example, all of the records 112 that have the token HOT are linked to the token HOT, all of the records 112 that have the token CHOCOLATE are linked to the token CHOCOLATE, and so forth.

With respect to the token PACKET, if the synonym locator 170 did not update the token-record mapping 155 with the synonyms, the token PACKET would not be linked to the second record 112-2 (because the second record 112-2 does not include the token PACKET, but rather it recites PCKT). However, the synonym locator 170 has identified PCKT as a synonym of PACKET, and since the second record 112-2 includes the token PCKT, the synonym locator 170 has added a link from the PACKET token to the second record 112-2 (thus adding record 176).

With respect to the token PCKT, if the synonym locator 170 did not update the token-record mapping 155 with the synonyms, the token PCKT would not be linked to the first record 112-1 (because the first record 112-1 does not include the token PCKT, but rather it recites POCKET). However, the synonym locator 170 has identified PCKT as a synonym of PACKET, and since the first record 112-1 includes the token PACKET, the synonym locator 170 has added a link from the token PCKT to the first record 112-1. (thus adding record 177). Also, the synonym locator 170 has added a link from the token PCKT to the third record 112-3 (thus adding record 178), and added a link from the token POCKET to the fourth record 112-4 (thus adding record 179) for the same reasons described above.

Figure 10:
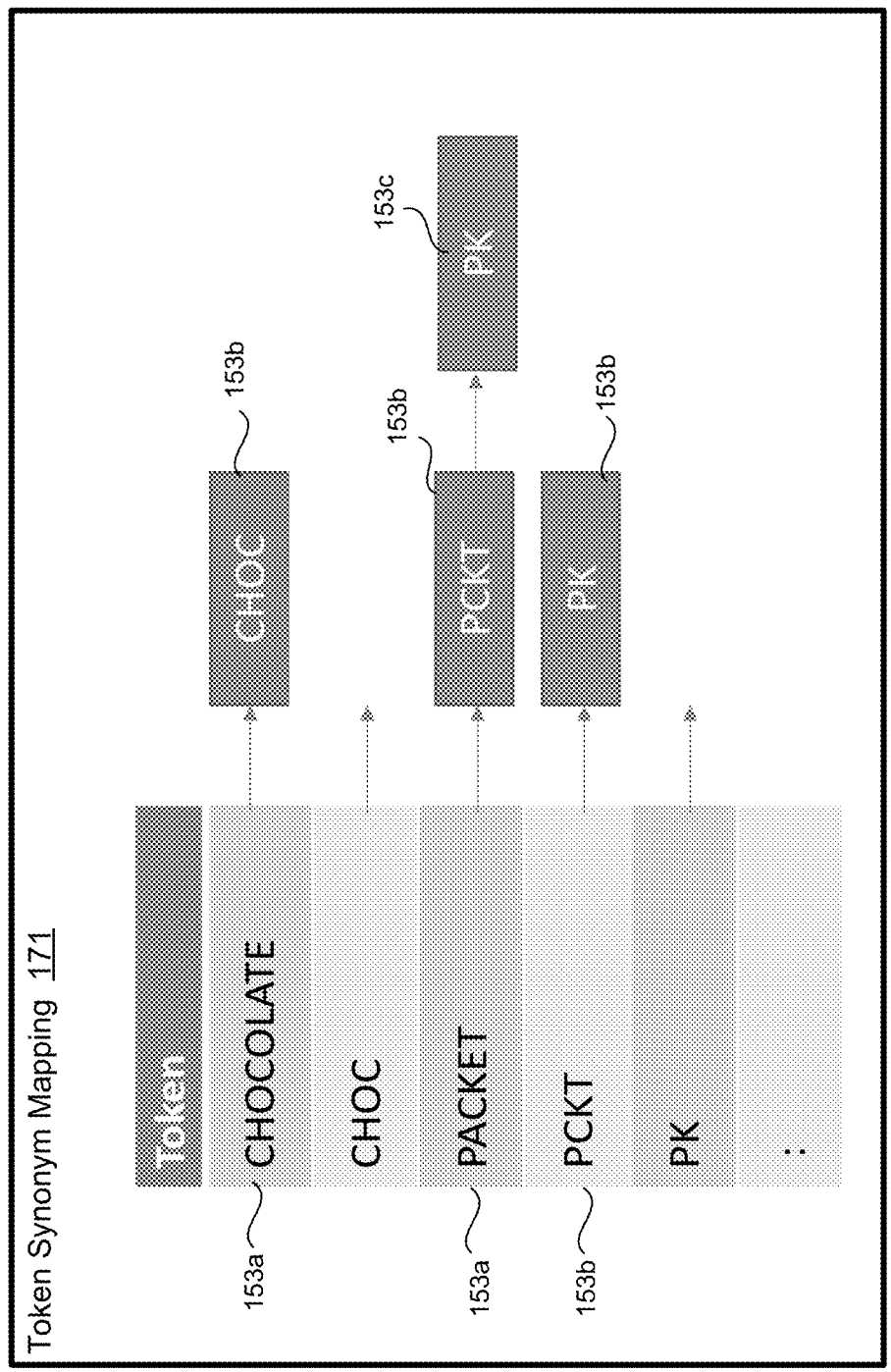
FIG. 10 illustrates an example of a token synonym mapping for automatic abbreviation to fit within a length constraint according to an implementation.

FIG. 10 illustrates an example of the token synonym mapping 171 for automatic abbreviation to fit within a length constraint according to an implementation. The token synonym mapping 171 may be expressed in a data structure that includes an index of tokens and one or more synonyms linked to one or more tokens. For example, the token synonym mapping 171 identify tokens 153b (and token 153c) as synonyms of tokens 153a. In the example of FIG. 10, the token CHOC is identified as a valid synonym for the token CHOCOLATE, the tokens PCKT and PK as valid synonyms for the token PACKET, and PK as valid synonyms for the token PK.

When the user is entering a new description, and needs to abbreviate a term in that description, the synonym standardizer 172 may analyze the newly entered description and compare the description to other similar existing records 112 that contain an abbreviation for a term in the newly entered description. In some examples, the synonym standardizer 172 may calculate a confidence level based on the level of similarity between the new record and the existing records (e.g., how much context they share, how conventional the abbreviation is, and how many existing records 112 share the same abbreviation), and select a particular term (token) to abbreviate (over other ones) based on the confidence level(s).

For example, referring to FIGS. 8 and 10, the synonym standardizer 172 may determine that CHOC is unambiguously an abbreviation for CHOCOLATE, whereas PK is possibly an abbreviation for PACKET or POCKET. When forced to abbreviate to save, say, 4 characters, the synonym standardizer 172 may choose to reclaim 5 characters by replacing CHOCOLATE with CHOC rather than reclaiming exactly 4 characters by replacing PACKET with PK since the confidence level for the synonym pair CHOCOLATE-CHOC is higher than PACKET-PK. The resulting abbreviated string would have fewer ambiguities.

As another example, the synonym standardizer 172 may count the number of times a particular abbreviation is applied, determine a confidence level for a particular abbreviation based on the number of times the abbreviation is applied, and apply the abbreviation to the token that has the higher confidence level. For instance, if PACKET is abbreviated to PCKT in 40% of the records 112 containing PACKET, but CHOCOLATE is abbreviated to CHOC in only 10% of the records 112, then the synonym standardizer 172 may determine to abbreviate PACKET to PCKT since that is relatively prevalent in the existing database 108. In some examples, it is assumed that the existing database has either been abbreviate by humans, or at least approved by humans—so the system's job is to be as consistent as possible with the existing records 112. Also, if the newly entered description needs to be abbreviated further, the synonym standardizer 172 may determine to proceed abbreviate less confident terms (e.g., in order of confidence level).

In other examples, the synonym standardizer 172 determines the number of contexts that apply when abbreviating, and assigns a confidence level based on the number of contexts. For example, referring to FIG. 8, the first set of records shows that the context of HOT & CHOCOLATE supports abbreviating PACKET as PCKT. Likewise, the second set of records show that HOT & OZ supports abbreviating PACKET as PCKT. So, if the user were entering HOT CHOCOLATE 16 OZ PACKET, the synonym standardizer 172 may determine the number of contexts that apply as two for abbreviating PACKET to PCKT. For explanatory purposes only, suppose there is a set of records where the only time that CHOCOLATE was ever abbreviated to CHOC was when it appeared with HOT and PACKET. Given this evidence, the synonym standardizer 172 may assign a higher confidence to the abbreviation of PACKET to PCKT.

Also, the synonym standardizer 172 may incorporate the token importance calculator 156 and token importance values 157 explained with reference to FIG. 2. For example, that calculation ranked the tokens 153 within a record 112 by relative importance. The synonym standardizer 172 may factor that relative importance into the abbreviation calculation and choose to abbreviate the tokens 153 with the lowest importance.

Figure 11:
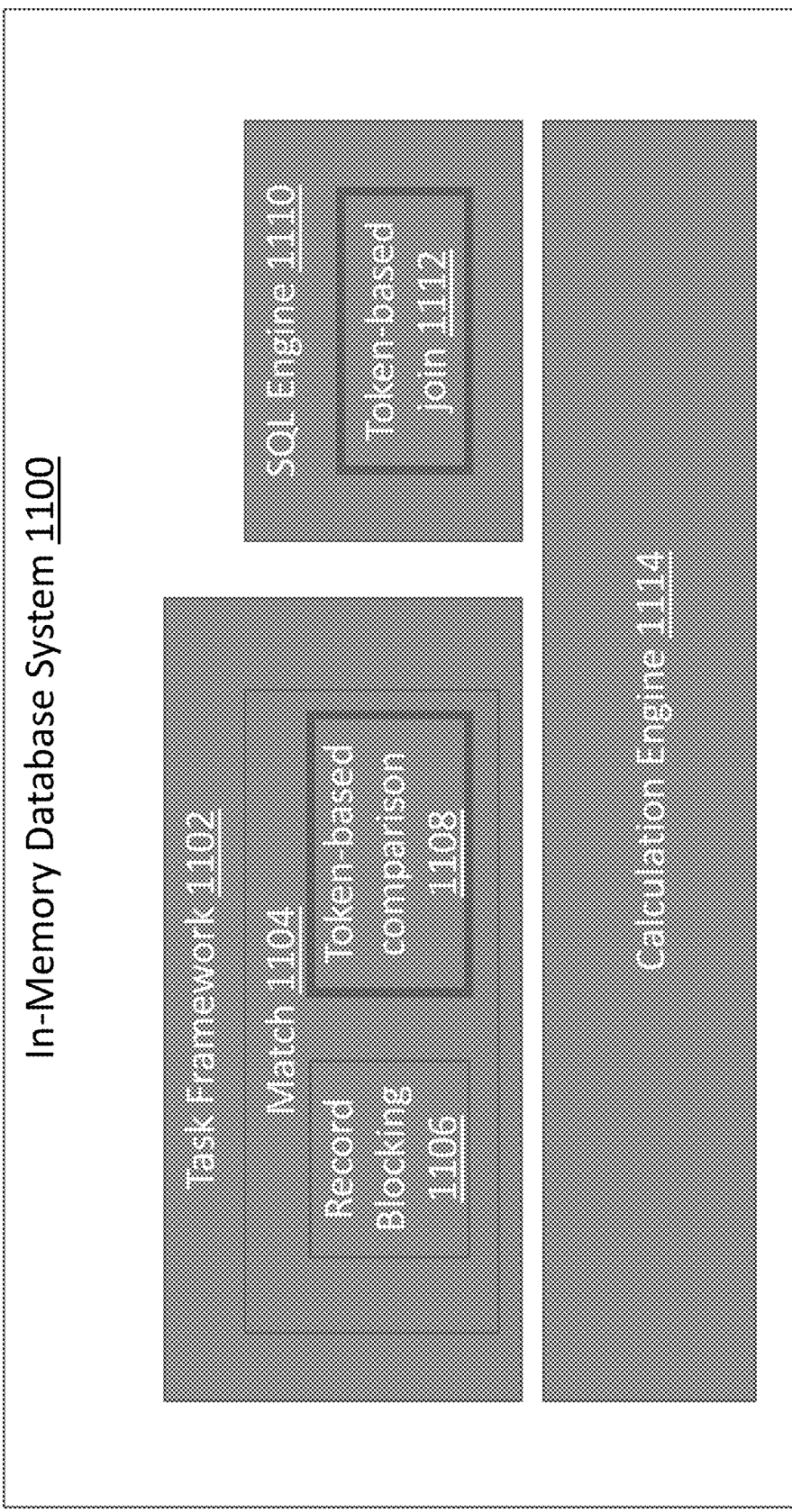
FIG. 11 illustrates an in-memory database system that implements the token-based entity resolution technique according to an implementation.

FIG. 11 illustrates an in-memory database system 1100 that implements the token-based entity resolution techniques described with reference to the previous figures according to an implementation. The in-memory database system 1100 is a type of a relational database management system (RDBMS) that relies on main memory for computer data storage. In contrast, conventional database systems employ a disk storage mechanism. In some examples, the in-memory database system 1100 includes a combination of main memory and disk storage. Also, the in-memory database system 1100 may support real-time analytics and transactional processing including replication and aggregation techniques. Also, within the in-memory database environment, query/calculation logic is pushed down into the database layer (as opposed to remaining in the application layer) such that the processing time for querying and manipulating the data within the database (e.g., database 108) may be reduced as compared with conventional relational database systems. In some examples, the in-memory database system 1100 may be HANA Enterprise 1.0 (any other versions) that is developed by SAP.

The in-memory database system 1100 may include a task framework 1102 having a match component 1104. The task framework is a processing abstraction within the in-memory database system 1100 that permits the processing of data to be described as a task plan. A task plan is a directed acyclic graph of transforms where each transform represents a specific type of processing. Conceptually, data is passed from one transform and the corresponding output data is passed to the next transform in the graph until a terminal transform is reached. The match component 1104 includes a token-based comparison component 1108 configured to execute the token-based entity resolution circuitry 150 within the context of the in-memory database system 1100. Also, the in-memory database system 1100 may employ record blocking 1106 as an additional mechanism to identify similar records.

The in-memory database system 1100 may include a SQL engine 1110 that includes one or more engines that process queries using SQL. The SQL engine 1110 may execute queries according to an SQL model. Typically, the SQL engine 1110 may process queries (or portions of queries) that require relational operators such as joins, unions, intersections, differences, selections, projections, joins, and sorting, etc. The SQL model may be a query plan or query scenario for querying the database. The SQL model may include a collection of operators designed to accomplish the functions related to the query. The SQL model may include an arrangement of operator nodes that encapsulate relational operations for executing the query. The operator nodes may be arranged in a tree structure, where results flow from a lower portion of the tree to an upper portion of the tree. Each operator node may include zero or more child nodes, where output from the child nodes are fed as input to related parent nodes. For instance, a join node may include two child nodes that may represent two join operands, whereas a sort node may include a single child node with the input for sorting. Leaves of the tree may include operator nodes that produce results by scanning tables, including performing index scans and/or sequential scans.

The SQL engine 1110 may be configured to perform a token-based join 1112 that combines columns from one or more tables in the database. The token-based join 1112 may implement the the functionalities of the token-based entity resolution circuitry 150 within the context of the in-memory database system 1100 in order to identify records 112 that match (or substantially match) a query received by the SQL engine 1110. For example, the SQL engine 1110 may receive a query that identifies a particular record (or includes query terms to locate a match). The SQL engine 1110 may include the token-based entity resolution circuitry 150 (or a portion thereof) to identify similar records that meet the request.

The task framework 1102 and the SQL engine 1110 may reside on top of a calculation engine 1114. The calculation engine 1114 executes queries based on calculation models. In some examples, the calculation engine 1114 is used for complex calculations that cannot be accomplished by the SQL engine 1110. The calculation engine 1114 may execute the calculation models to obtain the calculation views. Also, the calculation engine 1114 may execute a series of calculation models that may be joined or stacked to produce multiple calculation views. The calculation views may be graphical views that consume other analytical, attribute, and/or calculation views and tables. The calculation views may include union, join, projection, and aggregation nodes (or any combination thereof), and provides enhanced features such as distinct, count, calculation, and dynamic joins. The calculation model is a generic query model that provides the framework for querying data in the database in an efficient manner. Similar to the SQL model, the calculation model specifies one or more operator nodes that encapsulate operations for executing the query, and the operator nodes may be arranged in a tree structure, where results flow from a lower portion of the tree to an upper portion of the tree. However, the calculation model may specify relatively more complex operations on the data in order to provide one or more calculation views. The calculation model may include custom calculation flows that provide enhanced functionality in contrast to standard SQL implemented by the SQL engine 1110.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program having the non-transitory computer readable medium, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. The programmable processors may be coupled to one or more semiconductor substrates. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system for automatically identifying synonyms within a token-based data management system, the system comprising:
   a database configured to store a plurality of records,
   a computing device having at least one processor and a non-transitory computer readable medium storing instructions that when executed by the at least one processor are configured to implement:
      a synonym locator configured to create a token synonym mapping by automatically identifying token synonyms within the plurality of records based on a statistical analysis of the plurality of records, the token synonym mapping including a first token linked to a second token, the second token being a valid synonym of the first token, wherein the token synonym mapping is based on context data associated with the second token, the context data being obtained from the plurality of records of the database, and
      wherein the synonym locator is further configured to automatically identify tokens from the plurality of records in the database by at least creating, within the plurality of records of the database, a first group of first similar tokens, creating, within the first group, a second grouping of second similar tokens, applying a synonym algorithm to identify potential synonyms for tokens not grouped within the first group or the second group, and matching, for the tokens not grouped, identified potential synonyms to a corresponding record of the database; and
      a synonym standardizer configured to standardize at least one record of the plurality of records based on the token synonym mapping so that, when the at least one record includes the second token, the synonym standardizer is configured to automatically replace the second token with the first token, wherein the synonym standardizer is further configured to calculate confidence levels for terms within a new record on a level of similarity of the new record to the records in the database, and determine to replace a first word with an abbreviation based on a confidence level of the first word being higher than a confidence level associated with another term included within the new record.

2. The system of claim 1 wherein the context data having a first context token and a second context token, wherein the synonym standardizer is configured to replace the second context token with the first context token if the at least one record also includes at least one of the first context token and the second context token.

3. The system of claim 1, wherein the synonym standardizer is configured to automatically abbreviate text within the new record based on the token synonym mapping, wherein the text includes the first word associated with the first token, and the synonym standardizer is configured to replace the first word with the abbreviation associated with the second token so that the text can fit within a fixed length of the record.

4. The system of claim 3, wherein the synonym standardizer is configured to automatically abbreviate the text in real time as a user is typing the text of the record.

5. The system of claim 3, wherein the synonym standardizer is configured to determine a number of times that the abbreviation has been replaced for the first word within the records of the database, and replace the first word with the abbreviation based on number of times being greater than a number of times that another word in the new record has been replaced with another word's abbreviation.

6. The system of claim 1, further comprising:
   token-based entity resolution circuitry configured to determine whether a current record is similar to one or more other records in the database based on a token-record mapping of tokens to records,
   the token-based entity resolution circuitry configured to update the token-record mapping based on identified token synonyms.

7. The system of claim 1, wherein the database is an in-memory database.

8. A non-transitory computer-readable medium storing executable instructions that when executed cause at least one processor to:
   create a token synonym mapping by automatically identifying token synonyms within a plurality of records stored in a database based on a statistical analysis of the plurality of records, the token synonym mapping including a first token linked to a second token, the second token being a valid synonym of the first token, wherein the token synonym mapping is based on context data associated with the second token, the context data being obtained from the plurality of records of the database, and
   wherein the token mapping further comprises automatically identify tokens from the plurality of records in the database by at least creating, within the plurality of records of the database, a first group of first similar tokens, creating, within the first group, a second grouping of second similar tokens, applying a synonym algorithm to identify potential synonyms for tokens not grouped within the first group or the second group, and matching, for the tokens not grouped, identified potential synonyms to a corresponding record of the database; and
   standardize at least one record of the plurality of records based on the token synonym mapping so that, when the at least one record includes the second token, the second token is automatically replaced with the first token, wherein the standardize further includes a calculation of confidence levels for terms within a new record on a level of similarity of the new record to the records in the database, and a determination of whether to replace a first word with an abbreviation based on confidence level of the first word being higher than a confidence level associated with another term included within the new record.

9. The non-transitory computer-readable medium of claim 8, wherein the context data includes a first context token and a second context token, wherein the executable instructions cause the at least one processor to replace the second context token with the first context token if the at least one record also includes at least one of the first context token and the second context token.

10. The non-transitory computer-readable medium of claim 8, wherein the executable instructions cause the at least one processor to automatically abbreviate text within the new record based on the token synonym mapping, wherein the text includes the first word associated with the first token, and the executable instructions cause the at least one processor to replace the first word with the abbreviation associated with the second token so that the text can fit within a fixed length of the record.

11. The non-transitory computer-readable medium of claim 10, wherein the executable instructions cause the at least one processor to automatically abbreviate the text in real time as a user is typing the text of the record.

12. The non-transitory computer-readable medium of claim 10, wherein the executable instructions cause the at least one processor to apply a synonym algorithm on groups of tokens from the plurality of records of the database to identify that the second token is a synonym of the first token.

13. A method for automatically identifying synonyms within a token-based data management system, the method including:
   creating, by at least one processor, a token synonym mapping by automatically identifying token synonyms within a plurality of records stored in a database based on a statistical analysis of the plurality of records, the token synonym mapping including a first token linked to a second token, the second token being a valid synonym of the first token, wherein the token synonym mapping is based on context data associated with the second token, the context data being obtained from the plurality of records of the database, and
   wherein the token mapping further comprises automatically identify tokens from the plurality of records in the database by at least creating, within the plurality of records of the database, a first group of first similar tokens, creating, within the first group, a second grouping of second similar tokens, applying a synonym algorithm to identify potential synonyms for tokens not grouped within the first group or the second group, and matching, for the tokens not grouped, identified potential synonyms to a corresponding record of the database; and
   standardizing, by the at least one processor, at least one record of the plurality of records based on the token synonym mapping so that, when the at least one record includes the second token, the second token is automatically replaced with the first token, wherein the standardizing further includes calculating confidence levels for terms within a new record on a level of similarity of the new record to the records in the database, and determining to replace a first word with an abbreviation based on confidence level of the first word being higher than a confidence level associated with another term included within the new record.

14. The method of claim 13, wherein the context data includes a first context token and a second context token, wherein the method further includes replacing the second context token with the first context token if the at least one record also includes at least one of the first context token and the second context token.

15. The method of claim 13, further comprising:
   automatically abbreviating text within a new record based on the token synonym mapping, wherein the text includes a word associated with the first token; and
   replacing the word with an abbreviation associated with the second token such so that the text can fit within a fixed length of the record.

16. The method of claim 15, wherein the text is automatically abbreviated in real time as a user is typing the text of the record.

17. The method of claim 13, further comprising:
   determining whether a current record is similar to one or more other records in the database based on a token-record mapping of tokens to records;
   updating the token-record mapping based on identified token synonyms;
   identifying a token of the current record as unimportant token based on token importance values of the tokens of the current record;
   removing the unimportant token from the updated token-record mapping;
   selecting records sharing at least one common token with the current record so that the at least one common token does not include the token identified as unimportant; and
   comparing the current record with each selected record of the selected records to determine whether the current record matches any of the selected records.

18. The method of claim 13, wherein the creating the token synonym mapping includes applying a synonym algorithm on groups of tokens from the plurality of records of the database to identify that the second token is a synonym of the first token.

* * * * *